(12) United States Patent
Kaiser et al.

(10) Patent No.: US 12,585,914 B2
(45) Date of Patent: Mar. 24, 2026

(54) SYSTEMS AND METHODS FOR GENERATING A STRUCTURAL MODEL ARCHITECTURE

(71) Applicant: Impulse Innovations Limited, London (GB)

(72) Inventors: Marcus Kaiser, London (GB); Rui Sampaio, London (GB); Andrew Lawrence, London (GB); Maksim Sipos, London (GB)

( * ) Notice: Subject to any disclaimer, the term of this patent is extended or adjusted under 35 U.S.C. 154(b) by 887 days.

(21) Appl. No.: 17/881,939

(22) Filed: Aug. 5, 2022

(65) Prior Publication Data

US 2023/0138016 A1 May 4, 2023

(30) Foreign Application Priority Data

Aug. 5, 2021 (GB) ...................................... 2111316

(51) Int. Cl.
*G06N 3/04* (2023.01)
*G06N 3/08* (2023.01)

(52) U.S. Cl.
CPC ................. *G06N 3/04* (2013.01); *G06N 3/08* (2013.01)

(58) Field of Classification Search
CPC .................................... G06N 3/04; G06N 3/08
See application file for complete search history.

(56) References Cited

U.S. PATENT DOCUMENTS

| | | | |
|---|---|---|---|
| 2010/0205138 A1 | 8/2010 | Zhang et al. | |
| 2020/0279417 A1 | 9/2020 | Lee et al. | |
| 2023/0325667 A1* | 10/2023 | Zhang .................... | G06N 7/023 |
| | | | 706/20 |

FOREIGN PATENT DOCUMENTS

| | | |
|---|---|---|
| CN | 108629062 A | 10/2018 |
| CN | 112163284 A | 1/2021 |
| EP | 3106998 A1 | 12/2016 |
| WO | 2020243965 A1 | 12/2020 |
| WO | 2021099338 A1 | 5/2021 |

OTHER PUBLICATIONS

Nadkarni, et al., published "A Bayesian network approach to making inferences in causal maps", in European Journal of Operational Research, vol. 128, Issue 3, dated Feb. 1, 2001, pp. 479-498.
Narendra, et al., published "Explaining Deep Learning Models using Causal Inference", in Arxiv.org, IBM Research, dated Nov. 11, 2018, 7 pages.

(Continued)

*Primary Examiner* — Hau H Hoang
(74) *Attorney, Agent, or Firm* — RC Trademark Company

(57) ABSTRACT

A method of generating a structural model architecture, comprising receiving an input causality map, including: a plurality of variables, one or more links providing an indication of influence between pairs of variables, wherein at least one link provides an indication of influence between an input variable and at least one other variable; and one or more constraints associated with one or more of the variables and/or links, and generating an architecture for a structural model based on the input causality map, the structural model configured to predict a value of an output variable based on a value of at least one other variable in the plurality of variables.

15 Claims, 3 Drawing Sheets

(56) References Cited

OTHER PUBLICATIONS

Combined Search and Examination Report under Sections 17 and 18(3) issued in GB Patent Application No. GB2111316.2 on Jan. 27, 2022, 10 pages.

Lawrence et al, published "Data Generating Process to Evaluate Causal Discovery Techniques for Time Series Data" in Cornell University Library on Apr. 16, 2021, 17 pages.

Extended European Search Report issued in EP Application No. EP22189120.3 on Jan. 9, 2023, 10 pages.

* cited by examiner

SYSTEMS AND METHODS FOR GENERATING A STRUCTURAL MODEL ARCHITECTURE

FIELD OF THE INVENTION

This invention relates in general to the field of structural models and, in particular, to the generation of an architecture for a structural model which can provide a predictive output.

BACKGROUND OF THE INVENTION

Computational models are widely used to generate predictive outputs. In particular learning algorithms that can be trained using established machine learning techniques can be used to generate valuable predictive outputs. Accurate and robust time-series predictions are particularly significant in the fields of Finance, IoT, Energy and Telecoms.

However, some of the most powerful models are too complicated for anyone to comprehend or explain. For instance, a densely connected deep neural network is highly flexible—it can learn very intricate patterns—but it is essentially a "black box". Conversely, more transparent models, like linear regression, are often too restrictive to be useful.

A second problem is that many models are underspecified. That is, one can find several different models with equally strong performance on a given test dataset. In other words, the quality of these models is indistinguishable according to the performance metric by which the models are evaluated.

Such models can be successful in artificial environments like board games, but often fail in real-world, dynamic, low signal-to-noise environments (such as financial markets or commercial sectors) because they can "overfit" to spurious correlations in the training data, resulting in a breakdown of the models in real-world applications.

The present invention aims to address these problems in the state of the art.

SUMMARY OF THE INVENTION

According to a first aspect of the present invention, there is provided a method of generating a structural model architecture, comprising:

receiving an input causality map, including:

a plurality of variables;

one or more relations providing an indication of influence between pairs of variables, wherein at least one link provides an indication of influence between an input variable and at least one other variable; and one or more constraints associated with one or more of the variables and/or links; and generating an architecture for a structural model based on the input causality map, the structural model configured to predict a value of an output variable based on a value of at least one other variable in the plurality of variables.

Embodiments of the present disclosure substantially eliminate or at least partially address the aforementioned problems in the prior art, and enable the structural model to be expressive, easy to comprehend (explainable), transparent, flexible, and specified. Due to this, the structural model does not overfit to spurious correlations in the training data and provides accurate and robust performance in real-world applications.

Optionally, the causality map is a directed acyclic graph, DAG, wherein a value of at least one child variable in the plurality of variables is determined according to a function including values of one or more parent variables in the plurality of variables which have an influence on the respective child variable.

Optionally, generating the structural architecture includes mapping each of the variables and links onto predetermined features of the structural model.

Optionally, the structural model includes one of a neural network model, a causal Bayesian network model, a decision tree-based model or a generalized additive model.

Optionally, the structural model includes at least one neural network model, and each variable is mapped onto one or more layers in the neural network model.

Optionally, the structural model includes at least one neural network model, and each relation is mapped onto one or more layers in the neural network model.

Optionally, a function of at least one of the layers in the neural network model is determined based on one or more constraints associated with the variable or relation which is mapped to the layer.

Optionally, the structural model includes one or more decision tree models, in which at least one parent variable in the plurality of variables is assessed to determine which variable to assess next out of one or more child variables in the plurality of variables which are influenced by the respective parent variable.

Optionally, the method further comprises optimizing the generated structural architecture by fusing a plurality of common operations.

Optionally, the constraints include any of a limit, a symmetry or a property of the associated variables or relation.

Optionally, the method further comprises:

receiving training data which includes values for the plurality of the variables; and training the structural model using the received training data.

Optionally, training the structural model comprises:

identifying a subset of the plurality of variables in the received training data;

identifying a portion of the structural architecture generated based on the subset of variables; and training a sub-network of the structural model using the received training data, wherein the sub-network corresponds to the identified portion of the architecture.

Optionally, the method further comprises, in response to receiving new data which includes values for the plurality of variables:

using the structural model to predict a value of an output variable based on a value of at least one other variable in the received new data; and outputting the predicted value of the output variable.

Optionally, the method further comprises outputting a distributional prediction using the structural model based on the causality map.

Optionally, the method further comprises outputting an interventional prediction using the structural model based on the causality map.

Optionally, the method further comprises outputting a counterfactual prediction using the structural model based on the causality map.

According to a second aspect of the present invention, there is provided a computer-readable medium comprising instructions which, when executed by a processor, cause the processor to perform the method of generating a structural model architecture.

According to a third aspect of the present invention, there is provided a system for generating a structural model architecture, comprising one or more processors configured to perform the method of generating a structural model architecture.

Additional aspects, advantages, features, and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

For a better understanding of the present invention and to show more clearly how it may be carried into effect, reference will now be made by way of example only, to the accompanying drawings, in which.

DETAILED DESCRIPTION OF THE INVENTION

The present invention relates to a processing apparatus and a method for generating a structural model architecture. In particular, a causality map is used to generate an architecture for a structural model, which can be trained and used to generate a predictive output.

Figure 1:
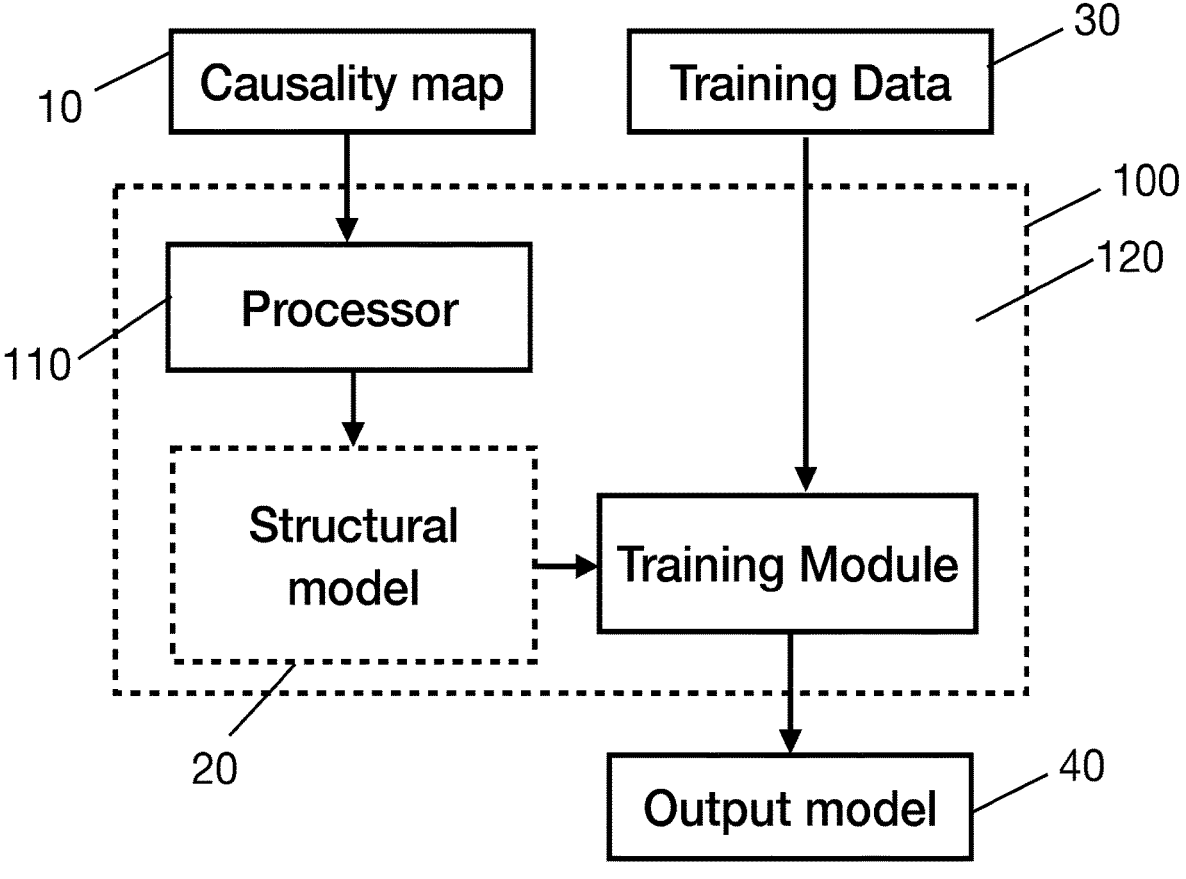
FIG. 1 is a schematic diagram showing a processing system according to an embodiment.

FIG. 1 of the accompanying drawings shows a schematic diagram of an embodiment of a processing apparatus 100 according to the present invention. The processing apparatus 100 comprises a processor 110 and a training module 120.

The term "processor" refers to a computational element that is operable to respond to and process instructions to perform the data backup operations. In an example, the processor 110 may be a microprocessor, a microcontroller, a complex instruction set computing (CISC) microprocessor, a reduced instruction set (RISC) microprocessor, a very long instruction word (VLIW) microprocessor, or any other type of processing circuit, for example as aforementioned. Notably, the processor 110 may be operated individually or as a part of a computation system. The training module 120 may be integrated with the processor 110 or implemented as a separate component. Moreover, the training module 120 comprises two machine learning models, a processing engine, and a backend server. The two machine learning models assist during the training phase, the processing engine processes actions and/or instructions of the training module 120 and the backend server stores data pertaining to the training module 120.

The processor 110 is configured to receive an input causality map 10. The causality map 10 includes a plurality of variables, one or more relations and one or more constraints. The processor 110 is configured to generate an architecture for a structural model 20 based on the input causality map 10. The structural model 20 is configured to predict a value of an output variable based on a value of at least one other variable in the plurality of variables. Herein, the output variable may be at least one of: an endogenous variable, an exogenous variable, a latent variable. Optionally, the structural model 20 is implemented as a structural causal model (SCM), a probabilistic causal model (PCM), or a graphical causal model (GCM). It will be appreciated that the structural model 20 is also configured to classify, find a counterfactual, quantify an uncertainty, predict values (regression or quantile regression), find a variable significance, and so forth. Moreover, such causal models support many functional dependencies. This enables the structural model 20 to be more expressive as compared to linear models disclosed in the prior art. Notably, this structural causal modelling is different from mere causal discovery where one finds the graph structure but not the corresponding functional dependencies. Notably, causal discovery is often a precursor to the present invention of fitting the structural model 20. Optionally, the structural model 20 is also configured to perform causal effect estimation, wherein the model quantifies how much one variable will change in response to intervening upon another variable. This is different than the conditional expectation as the interventional distribution is often not equal to the conditional distribution. A causal effect is often referred to as a treatment effect. Traditionally, this effect is measured using randomized controlled trials (RCTs), but they are often infeasible, unethical, and/or expensive. It will be appreciated that the structural model 20 being trained on observational and/or interventional data enables a useful effect.

At least one of the variables is an input variable. At least one of the variables is an output variable. An input variable may also be referred to as a causal driver. An output variable may also be referred to as a target variable. In some examples, the variables may include a measurable parameter associated with a value. Values associated with a variable may be continuously distributed or may be discrete. In some examples, variables may be associated with a category, classification, ordinal ranking, or label.

Each of the relations provides an indication of influence between a pair of variables. At least one of the relations provides an indication of influence between an input variable and at least one other variable.

Each of the constraints is associated with one or more of the variables and/or relations. In some examples, the constraints may be any of a limit, a symmetry or a property of the associated variables or relations. For example, a constraint on a relation may specify that the relation between two variables is any of e.g., linear, piecewise, monotonic, polynomial, non-linear, positive, negative, concave, or convex.

In this way, known limitations on the variables or relations can be directly applied by a skilled person who is knowledgeable in the associated field. Any suitable constraint on a variable and/or relation can be included as part of the causality map 10 and used to improve the architecture of the structural model 20.

Figure 2:
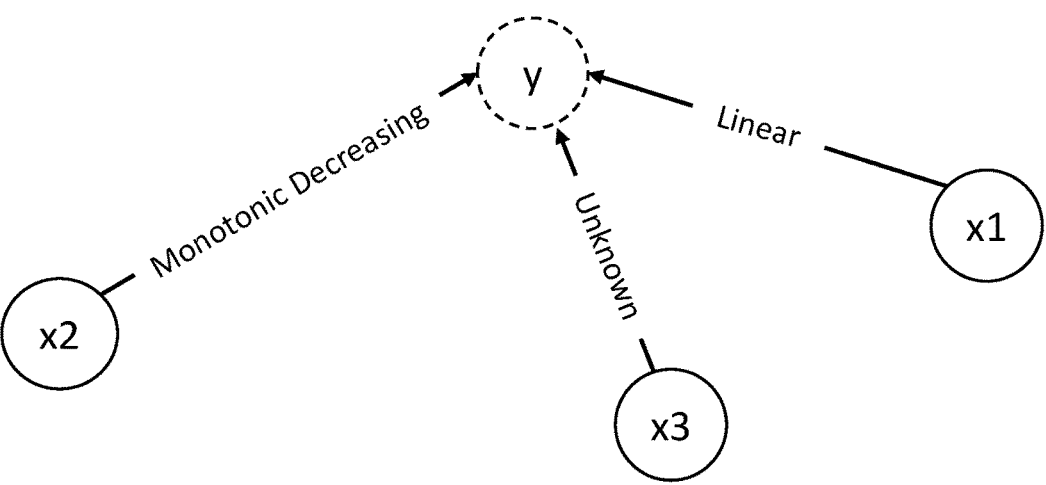
FIG. 2 is an illustration showing an exemplary causality map, according to an embodiment.

FIG. 2 of the accompanying drawings shows a representation of the causality map 10 as a directed graph, in accordance with one or more embodiments. In the directed graph, a value of at least one child variable in the plurality of variables may be determined according to a function including values of one or more parent variables in the plurality of variables which have an influence on the respective child variable. The graph may represent the variables as nodes and the relations between them as edges. As shown, the directed graph may include a child variable Y having three parent variables X1, X2 and X3. Each of the parent variables X1, X2 and X3 may have an influence on the child variable Y.

5
6

The value of the child variable Y may be determined according to a function including values of the parent variables X1, X2 and X3. It will be appreciated that the causality map 10 may also be represented using a range of graphs and data structures as described in the summary of the invention. Notably, the causality map 10 is often described by a domain expert, discovered from experimentation, discovered from observational data using causal discovery, or a permutation and/or combination of the same. After learning the causality map 10, the graph learns the structural model 20. It will be appreciated that the structural model 20 is built on top of the causality map 10, which enables identification of dependencies between the variables in the graph. Such dependencies are functional or probabilistic dependencies. Optionally, the causal model is integrated with a structure learning algorithm (i.e., a causal discovery algorithm).

In some examples, the nodes and edges of the graph may represent computations. For example, an edge may be associated with one or more one-input/one-output functions e.g., sigmoid, or scalar multiplication. A node may be associated with an aggregation multiple-input/one-output function e.g., a sum, product, polynomial, or multi-layer perceptron. In some examples, a node may also be associated with one or more one-input/one-output functions e.g., ReLU. Herein, the edges may be linked to the nodes or to a taxonomy. Notably, the taxonomy is pre-defined. It will be appreciated that the term 'linked' means 'having relations with', since the nodes may have relations with the nodes or with a taxonomy.

As shown, each of the variables and relations may be associated with one or more constraints. For example, a constraint on the link between X1 and Y indicates that the relation between the two variables is linear. A constraint on the link between X2 and Y indicates that the relation between the two variables is monotonically decreasing.

In some embodiments, the directed graph may allow cycles. For example, in some embodiments, the direction of influence is not solely in one direction, e.g., X1 may be the child variable of the parent variable Y, but X1 may also be a parent variable of Y (or equivalently, Y may be a child variable of X1). In some examples, a directed graph may include a loop of influence between three or more variables. In some embodiments, a directed graph may be particularly suitable to generate an architecture for a decision tree model.

Herein, the directed graph is a causal graph. In some examples, the directed graph may be a directed acyclic graph, DAG, which does not allow cycles. In some embodiments a DAG may be particularly suitable to generate an architecture for, e.g., a neural network model. In other examples, the directed graph may be at least one of: a completed partially directed acyclic graph (CPDAG), a maximal ancestral graph (MAG), a partial ancestral graph (PAG), a maximal arid graph (MArG), an acyclic directed mixed graph (ADMG), an ancestral ADMG, an arid ADMG, a bow-free ADMG, an alternative acyclic directed mixed graph (aADMG), a conditional acyclic directed mixed graph (CADMG), a bow-free acyclic path (BAP), a mixed graph. In yet other examples, the causality map 10 is a conditional directed acyclic graph (CDAG), also referred to as conditional acyclic directed graphs (CADGs), wherein some variables (primary variables) are those of direct interest, i.e., a target variable, and some variables (secondary variables) that are known to influence the primary variables, but whose mutual associations are not fully known. In all cases, the directed graph supports general Markov Equivalence class of graphs. Optionally, the causality map 10 is a Markov equivalence class of graph, wherein each graph in the equivalence class encodes the same set of conditional independencies. A Markov equivalence class is encoded as at least one of: a completed partially directed acyclic graph (CPDAG), a partial ancestral graph (PAG).

Optionally, the causality map 10 is a segregated graph or a chain graph. Optionally, the causality map 10 is an undirected graph, wherein conditional independencies are encoded but the flow of information through the graph is not defined, i.e., it is not clear which variable is the parent and which is the child for a single edge. Optionally, the causality map 10 represents a hierarchy of variables, wherein the causal ordering (i.e., a topological order of a causality map 10) of the variables is defined.

It will be appreciated that the causality map 10 being graphical is not an essential representation to be shown to a user. However, the causality map 10 may be implemented in any non-graphical form as well. Similarly, the causality map 10 may be non-graphical as well.

Figure 3:
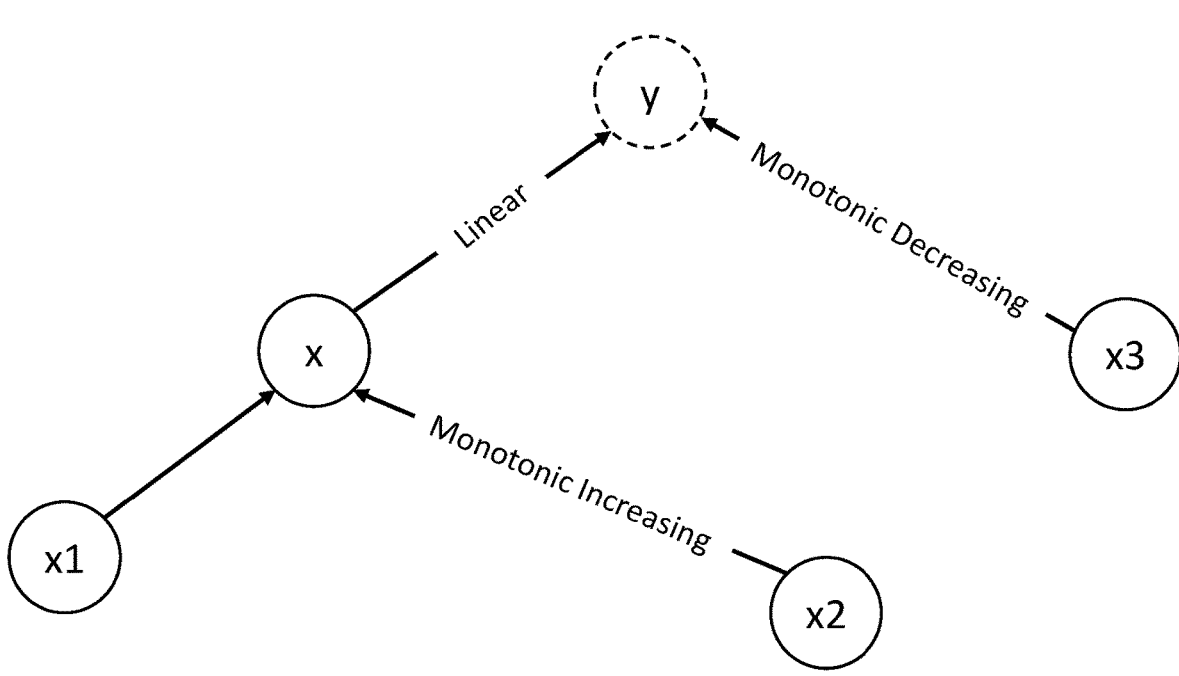
FIG. 3 is an illustration showing an exemplary causality map, according to an embodiment.

FIG. 3 of the accompanying drawings shows another example of a DAG, including one or more latent variables. Latent variables may be used to express complex associations and may not be directly related to a measurable parameter. For example, as shown, the parent variables X1 and X2 may have an influence on a latent variable X. The value of the latent variable X may be determined according to a function including values of the parent variables X1 and X2. The value of the child variable Y may be determined according to a function including values of the latent variable X and the parent variable X3.

As described herein, the causality map 10 can be generated by a user using efficient and intuitive methods for indicating the influence between variables. A skilled person who is knowledgeable in a certain field can be provided with the means to express their specialist knowledge by mapping out a causality map 10, which can be used to generate the architecture for the structural model 20.

In this way, an architecture for the structural model 20 can be generated such that a resulting structural model 20 reflects one or more known influences between variables or constraints on the variables. In this way, a skilled person who is knowledgeable in a certain field can be provided with the means to express their specialist knowledge in an intuitive way, which they can exploit to generate the structural model architecture, without specific knowledge of how such models are generated. Furthermore, the accuracy and robustness of the structural model 20 can be improved due to the constraints in fitting variables. Moreover, the risk of overfitting the structural model 20 based on training data can be reduced, i.e., the risk that spurious correlations are embedded in the model in a way which produces accurate results for training data but misinterprets real world data. The causal map 10 is provided to the structural model 20 during construction, and thereafter, relationships between the variables are fit based on the training data. Notably, the causal map 10 is not discovered from raw data.

Furthermore, the resulting structural model 20 can be "explainable" in that the architecture of the model is based on the input causality map 10 and is not simply a black box. In this way, the operation and accuracy of the model can be validated and the ability to regulate the model can be improved. It becomes possible to ensure that certain types of systematic biases that are present in training data are not embedded in the structural model 20.

In some embodiments, the processor 110 may be configured to map each of the variables and links onto predetermined features of the structural model 20.

In this way, a structural model 20 can be produced wherein the architecture of the model is more easily explained, in comparison with existing 'black box' models. By linking specific elements of the architecture with known constraints on variables or links between variables, the method can allow a skilled person to demonstrate at a high level how the results of their model are generated.

In some embodiments, the structural model 20 may include one of a neural network model, a causal Bayesian network model, a decision tree-based model (such as a simple Decision Tree, Random Forest, or Gradient Boosting Machine) or a generalized additive model. In this way, the processor 110 can be configured to generate an architecture for any of the most commonly used structural models, suitable for application to a wide variety of purposes.

In some embodiments, the structural model 20 includes at least one neural network model. An implementation of the neural network model may be based on a selected framework out of a number of suitable frameworks e.g., PyTorch, Pyro, TensorFlow, JAX, etc. The neural network model may include a plurality of layers, wherein each layer is associated with one or more operations e.g., convolution, deconvolution, pooling, softmax. Each layer may include a plurality of nodes or neurons each configured to perform the associated operation on one or more received inputs.

In some examples, each variable may be mapped onto one or more layers in the neural network model. In some examples, an input variable may be mapped onto an input layer. In some examples, a child variable may be mapped onto a fully connected layer or a softmax layer.

In some examples, each link may be mapped onto one or more layers in the neural network model. For example, the link can be mapped onto a linear activation, or a non-parametric monotonically increasing function, which can be learned from the training data.

In some examples, a function of at least one of the layers in the neural network model may be determined based on one or more constraints associated with the variable or link which is mapped to the layer. For example, a monotonic constraint can enforce that the final output of the one layer (or the multiple layers) must be monotonically increasing with the input variable.

In this way, an architecture for a neural network can be generated in a clearly explainable manner, such that the operations of the corresponding layers in the resulting structural model 20 can be directly related to a variable, constraint, or a link in the causality map 10. This is in contrast with many neural networks, which can be problematic as they are known to be 'black boxes' which produce results with no clear explanation.

In some embodiments, the structural model 20 includes one or more decision tree-based models (such as simple Decision Trees, Random Forests or Gradient Boosting Machines). A decision tree model may include a plurality of variables, including at least one parent variable and at least one child variable. A parent variable may influence one or more child variables, and the parent variable may be used to determine which of the child variables to assess next. In this way, a path through the decision tree can be traced, leading to an output variable which can be associated with a particular predicted value.

As such, an architecture for a decision tree model can be generated. According to the method, the accuracy and robustness of a fitted model can be improved, and the resulting model can be made "explainable", in comparison with a Random Forest model which is more difficult to interpret. Such explanations may be queried directly from the model since the model itself is inherently transparent, interpretable, and explainable. Notably, the explanations are not created separately from the model.

In some embodiments, the processor 110 may be configured to optimize the generated structural model architecture by fusing a plurality of common operations. In this way, the resources required to operate the structural model 20 can be reduced, leading to a more efficient implementation.

In some embodiments, the training module 120 may be configured to receive training data 30 which includes values for the plurality of the variables. In some examples, one or more items of the received training data 30 may include values for a subset of the plurality of variables. It will be appreciated that the training data 30 includes observational data and/or interventional data. The training data 30 being varied allows for appropriate training routines to be used. For example, a double machine learning (also known as debiased machine learning) approach can be used when only observational data is provided. Moreover, the training data 30 may be of any data type, including, but not limited to, tabular data (with continuous, discrete, categorical, and/or ordinal variables), textual data, graphical data, image-based data, time-series data. Beneficially, such training using two machine learning models enables a further technical effect of not allowing overfitting to spurious correlations in the training data. This enables accurate prediction of the output variables.

In some embodiments, the training module 120 may be configured to train the structural model 20 using the received training data 30. In a training process, one or more weights, parameters etc. of the structural model 20 may be tuned based on the training data 30. It will be appreciated that the training process supports more elaborate training routines and methods, such as the double machine learning framework, and is not merely a single end-to-end training routine as done with respect to neural networks.

In this way, the generated architecture of a structural model 20 can be used to generate an output model 40, i.e., a trained structural model, with all of the associated advantages. That is, the output model 40 will be more accurate, more robust, and more "explainable", in that it is possible to interpret how the input variables in the training data are used to generate predictions for the output variables. In this way, during the training process, the generated architecture improves the ability to validate the training process, ensuring that the model is not overfitted to the training data 30. This can ensure that the output model 40 will behave correctly and predictably when applied to real world data. Notably, the predictions generated for the output variables may be at least one of: point predictions, distributional predictions. The point predictions refer to predictions which are specified by a single value. The distributional predictions refer to predictions which represent probability distributions, parameters of a probability distribution, e.g., the location and scale of a distribution in the location-scale family of probability distributions, samples from a probability distribution, or are distributed over a range of values. Often, the (conditional) mean of a distributional prediction is the point prediction. Optionally, the structural model 20 is interpretable, such that a path from the causal map 10 is followed within the structural model 20 and is inspected by the user.

In some embodiments, the output model 40 is an ensemble of structural models 20. The training module 120 can be configured to train multiple structural models 20 for the same causality map 10 and ensemble them to produce the output model 40. This helps improve accuracy and robustness further as each model can capture slightly different variance found in the training data 30.

In some embodiments, training the structural model 20 may include identifying a subset of the plurality of variables in the received training data 30. The training module 120 may be configured to identify a portion of the structural architecture generated based on the subset of variables, and a sub-network of the structural model 20 which corresponds to the identified portion of the architecture. The training module 120 may be configured to train the identified sub-network using the identified subset of the received training data 30.

In this way, because the generated architecture for the structural model 20 can provide an indication of which elements of the architecture correspond to the variables, constraints and/or links in the causality map 10, those elements of the structural model 20 can be trained using a subset of the training data 30 which is pertinent to the corresponding variables, constraints and/or links. In this way, the training process can be made more efficient, and training data with a limited insight (e.g., applicable to a small subset of variables) can still be exploited to improve the overall accuracy and robustness of the output model 40.

In some embodiments, the output model 40 may be configured to receive new data which includes values for the plurality of variables. In response to receiving the new data, the output model 40 may be configured to predict a value of an output variable based on a value of at least one other variable in the received new data and output the predicted value of the output variable. It will be appreciated that the new data is utilized to further train the model (i.e., update it) or to use it for prediction.

In this way, an output model 40 based on the generated architecture can be used to generate real-world predictions. By the generating of the architecture by the processor 110, the predicted values output by the output model 40 can be made generally more accurate. In particular, the application of the output model 40 to new data, e.g., real world data, can be made more accurate by preventing the overfitting of the structural model 20 to the training data 30.

In some embodiments, the output model 40 may be further configured to output an interventional prediction based on the causality map 10. For example, the value associated with one or more variables may be altered and the effect propagates through to the other variables according to the causality map 10 and the output model 40. This enables a further technical effect of answering the question of what would happen if a variable were changed to a specific value and/or changed by a certain amount.

In some embodiments, the output model 40 may be further configured to output a counterfactual prediction based on the causality map 10. For example, the value associated with one or more variables may be altered to output an alternative prediction value corresponding to the altered variable. This enables a further technical effect of answering what would have happened if a variable was changed to a specific value and/or changed by a certain amount. The interventional prediction answers the forward-looking questions while the counterfactual prediction answers the retrospective question.

In this way, the output of the output model 40 can be made more "explainable". In addition to improving the ability to directly interpret the prediction made, the output model 40 can provide interventional and counterfactual predictions that help to indicate why the original predicted value was reached. This enables a further technical effect of visibility within the system, which allows the user to effectively understand and interact with the system. This in-turn enables effective decision-making by the user.

Figure 4:
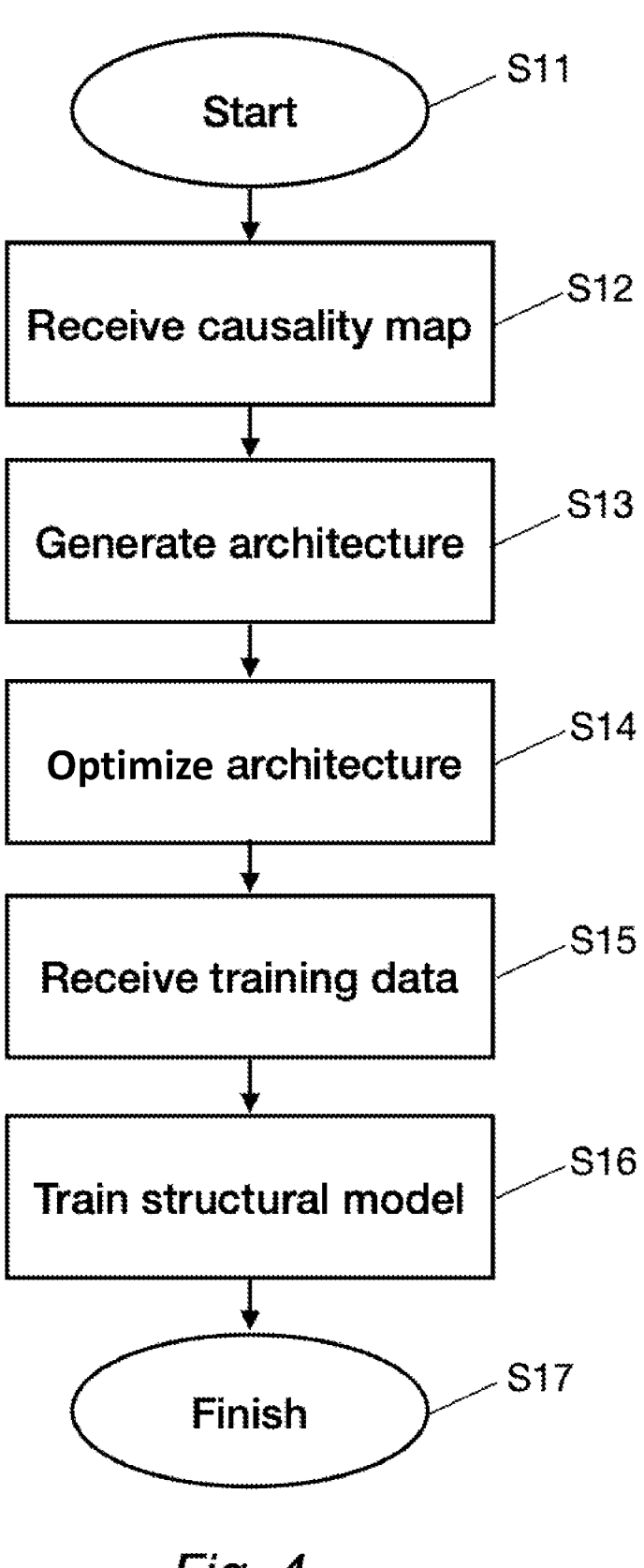
FIG. 4 is a flowchart showing a method of generating a structural model architecture according to an embodiment.

FIG. 4 of the accompanying drawings shows a flowchart representing a method of generating a structural model architecture according to an embodiment. The method as depicted is a computer-implemented method. The method starts at step S11.

At step S12, the method includes receiving an input causality map. The causality map includes a plurality of variables, one or more links and one or more constraints.

At least one of the variables is an input variable. At least one of the variables is an output variable. An input variable may also be referred to as a causal driver. An output variable may also be referred to as a target variable. In some examples, the variables may include a measurable parameter associated with a value. Values associated with a variable may be continuously distributed or may be discrete. In some examples, variables may be associated with a category, classification, ordinal ranking, or label. Optionally, the variables are implemented as at least one of: a continuous variable, a discrete variable, a categorical variable, an ordinal variables.

Each of the links provides an indication of influence between a pair of variables. At least one of the links provides an indication of influence between an input variable and at least one other variable.

Each of the constraints is associated with one or more of the variables and/or links. In some examples, the constraints may be any of a limit, a symmetry or a property of the associated variables or links. For example, a constraint on a link may specify that the relation between two variables is any of e.g., linear, piecewise, monotonic, polynomial, non-linear, positive, negative, concave, or convex.

In this way, known limitations on the variables or links can be directly applied by a skilled person who is knowledgeable in the associated field. Any suitable constraint on a variable and/or link can be included as part of the causality map and used to improve the architecture of the structural model.

In some embodiments, the causality map is a directed graph, wherein a value of at least one child variable in the plurality of variables may be determined according to a function including values of one or more parent variables in the plurality of variables which have an influence on the respective child variable. The graph may represent the variables as nodes and the links between them as edges. For example, a directed graph may include a child variable Y having three parent variables X1, X2 and X3. Each of the parent variables X1, X2 and X3 may have an influence on the child variable Y. The value of the child variable Y may be determined according to a function including values of the parent variables X1, X2 and X3.

In this way, the nodes and edges of the graph may represent computations. For example, an edge may be associated with one or more one-input/one-output functions e.g., sigmoid, or scalar multiplication. A node may be associated with an aggregation multiple-input/one-output function e.g., a sum, product, or multi-layer perceptron. In some examples, a node may also be associated with one or more one-input/one-output functions e.g., ReLU.

In some examples, the graph may include one or more latent variables. Latent variables may be used to express complex associations and may be not directly related to a measurable parameter. For example, in the example above, the parent variables X1 and X2 may have an influence on a latent variable X. The value of the latent variable X may be determined according to a function including values of the parent variables X1 and X2. The value of the child variable Y may be determined according to a function including values of the latent variable X and the parent variable X3.

In this way, the causality map 10 can be generated by a user using efficient and intuitive methods for indicating the influence between variables. A skilled person who is knowledgeable in a certain field can be provided with the means to express their specialist knowledge by mapping out a directed acyclic graph, which can be used to generate the structural model architecture.

In some embodiments, the directed graph may allow cycles. For example, in some embodiments, the direction of influence is not solely in one direction, e.g., X1 may be the child variable of the parent variable Y, but X1 may also be a parent variable of Y (or equivalently, Y may be a child variable of X1). In some examples, a directed graph may include a loop of influence between three or more variables. In some embodiments, a directed graph may be particularly suitable to generate an architecture for a decision tree model.

In some examples, the directed graph may be a directed acyclic graph, DAG, which does not allow cycles. In some embodiments a DAG may be particularly suitable to generate an architecture for, e.g., a neural network model.

At step S13, the method includes generating an architecture for a structural model based on the input causality map. The structural model is configured to predict a value of an output variable based on a value of at least one other variable in the plurality of variables.

In this way, an architecture for a structural model can be generated such that a resulting structural model reflects one or more known influences between variables or constraints on the variables. In this way, a skilled person who is knowledgeable in a certain field can be provided with the means to express their specialist knowledge in an intuitive way, which they can exploit to generate the structural model architecture, without specific knowledge of how such models are generated. Furthermore, the accuracy and robustness of the resulting model can be improved, due to the constraints in fitting variables. Moreover, the risk of overfitting the model based on training data can be reduced, i.e., the risk that spurious correlations are embedding in the model in a way which produces accurate results for the training data but misinterprets real world data.

Furthermore, the resulting structural model can be "explainable" in that the architecture of the model is based on the input causality map and is not simply a black box. In this way, the operation and accuracy of the model can be validated and the ability to regulate the model can be improved. It becomes possible to ensure that certain types of systematic biases that are present in training data are not embedded in the structural model.

In some embodiments, generating the structural architecture may include mapping each of the variables and links onto predetermined features of the structural model.

In this way, a structural model can be produced wherein the architecture of the model is more easily explained, in comparison with existing 'black box' models. By linking specific elements of the architecture with known constraints on variables or links between variables, the method can allow a skilled person to demonstrate at a high level how the results of their model are generated.

In some embodiments, the structural model may include one of a neural network model, a causal Bayesian network model, a decision tree-based model (such as a simple Decision Tree, Random Forests or Gradient Boosting Machine) or a generalized additive model. In this way, the method can be applied to generate an architecture for any of the most commonly used structural models, suitable for application to a wide variety of purposes.

In some embodiments, the structural model includes at least one neural network model. An implementation of the neural network model may be based on a selected framework out of a number of suitable frameworks e.g., PyTorch, Pyro, TensorFlow, JAX etc. The neural network model may include a plurality of layers, wherein each layer is associated with one or more operations e.g., convolution, deconvolution, pooling, softmax. Each layer may include a plurality of nodes or neurons each configured to perform the associated operation on one or more received inputs.

In some examples, each variable may be mapped onto one or more layers in the neural network model. In some examples, an input variable may be mapped onto an input layer. In some examples, a child variable may be mapped onto a fully connected layer or a softmax layer.

In some examples, each link may be mapped onto one or more layers in the neural network model. For example, the link can be mapped onto a linear activation, or a non-parametric monotonically increasing function, which can be learned from the training data.

In some examples, a function of at least one of the layers in the neural network model may be determined based on one or more constraints associated with the variable or link which is mapped to the layer. For example, a monotonic constraint can enforce that the final output of the one layer (or the multiple layers) must be monotonically increasing with the input variable.

In this way, an architecture for a neural network can be generated in a clearly explainable manner, such that the operations of the corresponding layers in the resulting structural model can be directly related to a variable, constraint, or a link in the causality map. This is in contrast with many neural networks, which can be problematic as they are known to be 'black boxes' which produce results with no clear explanation.

In some embodiments, the structural model includes one or more decision tree models. A decision tree model may include a plurality of variables, including at least one parent variable and at least one child variable. A parent variable may influence one or more child variables, and the parent variable may be used to determine which of the child variables to assess next. In this way, a path through the decision tree can be traced, leading to an output variable which can be associated with a particular predicted value.

As such, an architecture for a decision tree model can be generated. According to the method, the accuracy and robustness of a fitted model can be improved, and the resulting model can be made "explainable", in comparison with a Random Forest model which is more difficult to interpret.

In some embodiments, the method may include, at step S14, optimizing the generated structural architecture by fusing a plurality of common operations.

In this way, elements of the structural model architecture which do not contribute significantly to the output can be removed. In this way, the resources required to operate the structural model can be reduced, leading to a more efficient implementation In some embodiments, the method may include, at step S15, receiving training data which includes values for the plurality of the variables. In some examples, one or more items of the received training data may include values for a subset of the plurality of variables.

In some embodiments, the method may include, at step S16, training the structural model using the received training data. In a training process, one or more weights, parameters etc. of the structural model may be tuned based on the training data.

In this way, the output architecture of a structural model can be used to generate a trained structural model with all of the associated advantages. That is, the resulting trained model will be more accurate, more robust, and more "explainable", in that it is possible to interpret how the input variables in the training data are used to generate predictions for the output variables. In this way, during the training process, the method improves the ability to validate the training process, ensuring that the model is not overfitted to the training data. This can ensure that the trained model will behave correctly and predictably when applied to real world data.

In some embodiments, training the structural model may include identifying a subset of the plurality of variables in the received training data. The method may include identifying a portion of the structural architecture generated based on the subset of variables, and a sub-network of the structural model which corresponds to the identified portion of the architecture. The method may include training the identified sub-network using the identified subset of the received training data.

In this way, because the generated architecture for the structural network can provide an indication of which elements of the architecture correspond to the variables, constraints and/or links in the causality map, those elements of the structural model can be trained using a subset of the training data which is pertinent to the corresponding variables, constraints and/or links. In this way, the training process can be made more efficient, and training data with a limited insight (e.g., applicable to a small subset of variables) can still be exploited to improve the overall accuracy and robustness of the structural model.

In some embodiments, the method may further include receiving new data which includes values for the plurality of variables. In response to receiving the new data, the method may include using the structural model to predict a value of an output variable based on a value of at least one other variable in the received new data and outputting the predicted value of the output variable.

In this way, a structural model based on the generated architecture can be used to generate real-world predictions. By the application of the method of the present invention, the predicted values output by the model can be made generally more accurate. In particular, the application of the model to new data, e.g., real world data, can be made more accurate by preventing the overfitting of the model to the training data.

In some embodiments, the method may further include outputting an interventional prediction using the structural model based on the causality map.

In some embodiments, the method may further include outputting a counterfactual prediction using the structural model based on the causality map. For example, the value associated with one or more variables may be altered to output an alternative prediction value corresponding to the altered variable.

In this way, the output of the structural model can be made more "explainable". In addition to improving the ability to directly interpret the prediction made, the method can provide a counterfactual prediction that helps to indicate why the original predicted value was reached.

The method finishes at step S17. It will be appreciated that the method of generating the structural model architecture may be implemented autonomously or semi-autonomously.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the scope of the invention as defined by the appended claims.

The invention claimed is:

1. A computer-implemented method of generating a structural model architecture, comprising one or more processors, wherein the method further comprises:
   receiving, by the processor, an input causality map from training data, including:
      a plurality of variables;
      one or more links providing an indication of influence between pairs of variables, wherein at least one link provides an indication of influence between an input variable and at least one other variable; and
      one or more constraints associated with one or more of the variables and/or links, wherein the one or more constraints include a limit, a symmetry and a property of the associated variables or links; and
   generating, by the processor an architecture for a structural model based on the input causality map, the structural model configured to predict a value of an output variable based on a value of at least one other variable in the plurality of variables.

2. The method of claim 1, wherein the causality map is a directed acyclic graph, DAG, wherein a value of at least one child variable in the plurality of variables is determined according to a function including values of one or more parent variables in the plurality of variables which have an influence on the respective child variable.

3. The method of claim 1, wherein generating the structural architecture includes mapping each of the variables and links onto predetermined features of the structural model.

4. The method of claim 1, wherein the structural model includes one of a neural network model, a causal Bayesian network model, a decision tree-based model or a generalized additive model.

5. The method of claim 4, wherein the structural model includes at least one neural network model, and each variable is mapped onto one or more layers in the neural network model.

6. The method of claim 5, wherein a function of at least one of the layers in the neural network model is determined based on one or more constraints associated with the variable or link which is mapped to the layer.

7. The method of claim 4, wherein the structural model includes at least one neural network model, and each link is mapped onto one or more layers in the neural network model.

8. The method of claim 4, wherein the structural model includes one or more decision tree models, in which at least one parent variable in the plurality of variables is assessed to determine which variable to assess next out of one or more child variables in the plurality of variables which are influenced by the respective parent variable.

9. The method of claim 1, further comprising optimizing the generated structural architecture by fusing a plurality of common operations.

10. The method of claim 1, further comprising:
   receiving training data which includes values for the plurality of the variables;
   training the structural model using the received training data.

11. The method of claim 10, wherein training the structural model comprises:

identifying a subset of the plurality of variables in the received training data;

identifying a portion of the structural architecture generated based on the subset of variables; and training a sub-network of the structural model using the received training data, wherein the sub-network corresponds to the identified portion of the architecture.

12. The method of claim 10, further comprising, in response to receiving new data which includes values for the plurality of variables:

using the structural model to predict a value of an output variable based on a value of at least one other variable in the received new data; and outputting the predicted value of the output variable.

13. The method of claim 12, further comprising:

outputting a counterfactual prediction using the structural model based on the causality map.

14. A non-transitory computer-readable medium comprising instructions which, when executed by a processor, cause the processor to perform the method of claim 1.

15. A system for generating a structural model architecture, comprising one or more processors configured to perform the method of claim 1.

\* \* \* \* \*